United States Patent
Nordine et al.

(10) Patent No.: US 6,484,539 B1
(45) Date of Patent: *Nov. 26, 2002

(54) GLASS FIBER HAVING COMPOSITIONS OF ALUMINA-LANTHANA AND MADE FROM UNDERCOOLED MOLTEN MATERIALS

(75) Inventors: Paul C. Nordine, Deerfield, IL (US); J. K. Richard Weber, Arlington Heights, IL (US); John J. Felten, Palatine, IL (US)

(73) Assignee: Containerless Research, Inc., Evanston, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,638
(22) Filed: Jul. 8, 1998

Related U.S. Application Data

(63) Continuation-in-part of application No. 08/807,580, filed on Jan. 9, 1997.
(60) Provisional application No. 60/009,732, filed on Jan. 11, 1996.

(51) Int. Cl.$^7$ ................................................. D02G 3/18
(52) U.S. Cl. ............................. 65/385; 501/35; 501/36; 501/152; 428/364
(58) Field of Search ............................. 65/385; 501/35, 501/36, 152; 428/364

(56) References Cited

U.S. PATENT DOCUMENTS

| 3,793,041 A | 2/1974 | Sowman |
| 3,795,524 A | 3/1974 | Sowman |

(List continued on next page.)

OTHER PUBLICATIONS

Kingery, W. D., et al., "Thermal Conductivity: X, Data for Several Pure Oxide Materials Corrected to Zero Porosity," Journal of the American Ceramic Society, vol. 37, pp. 107–110 (1954).

Brewer, L., and Rosenblatt, G. M., "Thermodynamics of Suboxide Vaporization," Transactions of the Metallurgical Society, vol. 224, pp. 1268–1271 (1962).

(List continued on next page.)

Primary Examiner—John Hoffmann
(74) Attorney, Agent, or Firm—Bullwinkel Partners, Ltd

(57) ABSTRACT

The present invention provides a method for drawing fibers from materials which exhibit low viscosities at the equilibrium melting temperature. Further, the present invention provides novel drawn fibers from materials which were thought to be incompatible with a fiber-drawing process. The present invention also provides a means of minimizing recrystallization of molten materials during fiber drawing. Still further, the present invention provides novel drawn fibers with a greater tensile strength and greater concentrations of additives as compared to prior art fibers. Lastly, the present invention provides a means for producing crystalline fibers with controlled chemical compositions, and fibers with high tensile strengths as compared to prior art fibers of the same composition. The present invention achieves these objectives by heating the desired materials until a liquid melt is formed, undercooling the melt until the proper viscosity is reached, initiating fiber drawing by inserting a "stinger" into the molten material, then finally drawing the fibers at the desired speed so that fibers of the desired composition and diameter are formed. If desired, crystalline fibers can be formed by heating the drawn fibers until crystallization occurs. The present invention also provides for drawing fibers from a melt under either containerless conditions or within a container.

2 Claims, 8 Drawing Sheets

U.S. PATENT DOCUMENTS

| | | | |
|---|---|---|---|
| 3,852,079 A | * | 12/1974 | Davis |
| 3,904,424 A | * | 9/1975 | Aoki |
| 3,928,049 A | * | 12/1975 | Otouma |
| 3,947,281 A | * | 3/1976 | Bacon |
| 4,012,213 A | | 3/1977 | Haggerty et al. |
| 4,030,901 A | | 6/1977 | Kaiser |
| 4,046,540 A | * | 9/1977 | Lewis |
| 4,047,965 A | | 9/1977 | Karst et al. |
| 4,110,002 A | * | 8/1978 | Klein |
| 4,127,415 A | * | 11/1978 | Quackenbush |
| 4,157,897 A | * | 6/1979 | Keat |
| 4,421,721 A | | 12/1983 | Byer et al. |
| 4,473,386 A | | 9/1984 | Strickland |
| 4,546,811 A | | 10/1985 | Potard |
| 4,565,557 A | | 1/1986 | Naumann et al. |
| 4,654,065 A | | 3/1987 | Naumann et al. |
| 5,100,449 A | | 3/1992 | Cornelius et al. |
| 5,215,688 A | | 6/1993 | Williamson et al. |
| 5,260,011 A | * | 11/1993 | Wolter |
| 5,516,481 A | | 5/1996 | Ishizaki et al. |
| 5,529,596 A | * | 6/1996 | Loftus |
| 5,552,213 A | | 9/1996 | Eschner |
| 5,554,324 A | * | 9/1996 | Bernard |
| 5,581,876 A | * | 12/1996 | Prabhu |

OTHER PUBLICATIONS

Aramaki, S., et al., "Revised Phase Diagram for the System Al2O3–SiO2," Journal of the American Ceramic Society, vol. 45, pp. 229–242 (1962).

Pollock, J. T. A., "Filamentary sapphire," Journal of Materials Science, vol. 7, pp. 787–792 (1972).

Nelson, L. S., Richardson, N. L., Keil, K., and Skaggs, S. R., "Effects of Oxygen and Argon Atmospheres on Pendant Drops of Aluminum Oxide Melted with Carbon Dioxide Laser Radiation," High Temperature Science 5, pp. 138–154 (1973).

Winborne, D. A., et al., "Areodynamic Levitation Technique for Containerless High Temperature Studies on Liquid and Solid Samples," Metallurgical Transactions, vol. 7B. pp. 711–713 (1976).

Prochazka, S., et al., "Infrared–Transparent Mullite Ceramic," Journal of the American Ceramic Society, vol. 66, pp. 874–880 (1983).

Ray C. S. Day, D. E., "Glass Formation in Microgravity," Materials Research Society, vol. 87, pp. 239–251 (1987).

Badets, M. C., et al., "Material Processing and Characterization of Y3Al5O12 and CaAl2O4 Glasses Obtained Under Contactless Conditions," Oxford, UK, Sep. 10–15, 1989.

Massiot, D., et al., "Structural Diagnostic of High Temperature Liquid Phases by 27 Al NMR," Coll. Phys. C5, pp. 425–431 (1990).

Wallenberger, F. T., et al., "Calcium aluminate glass fibers: drawing from supercooled melts versus inviscid melt spinning," Materials Letters, vol. 11, pp. 229–235 (1991).

Krishnan, S., et al., "Refractive Index of Liquid Aluminum Oxide at 0.6328 um," Journal of the American Ceramic Society, vol. 74, pp. 881–883 (1991).

Poe, B. T., et al., "SiO2–Al2O3 Liquids: In–Situ Study by High–Temperature 27 Al NMR Spectroscpy and Molecular Dynamics Simulation," J. Phys. Chem. 96, pp. 8220–8224–(1992).

Chen K. C., et al., "Ceramic Fiber Feasibility Studies," Materials Directorate, Wright Laboratory, Air Force Materiel Command, Wright–Patterson AFB OH, Report No. WL–TR–94–4022, Jul. 1993.

Olive, J. R., Hofmeister, W. H., et al., "Formation of tetragonal YBa2Cu3O7-8 from an undercooled melt," J. Mater. Res., vol. 9, No. 1, pp. 1–3, Jan. 1994.

Halloran, J. W., et al., "Creep Resistant Oxide Fibers," Materials Directorate, Wright Laboratory, Air Force Materiel Command, Wright–Patterson AFB OH Report No. WL–TR–94–4100, Mar., 1994.

Collins, J. M., et al., "Growth and Characterization of Single Crystal YAG Fibers," Materials Directorate, Wright Laboratory, Air Force Materiel Command., Wright–Patterson AFB OH, Report No.–TR–94–4085, Jun. 1994.

Weber, J. K. R., et al., "Effects of oxygen pressure on the structure of Y–Ba–Cu–O materials formed by containerless melting and solidification," J. Mater. Res. 9, pp. 1657–1660 (1994).

Weber, J. K. R., et al., "Aero–acoustic levitation: A method for conatinerless liquid–phase processing at high temperatures," Review of Scientific Instruments, vol. 65, pp. 456–465 (1994).

Weber J. K. R. et al., "Solidification Behavior of Undercooled Liquid Aluminum Oxide," Journal of the American Ceramic Society, 78, pp. 577–582 (1995).

Weber, J. K. R., et al., "Spectral Absorption Coefficient of Molten Aluminum Oxide feom 0.385 to 0.780 um," Journal of the American Ceramic Society, 78, pp. 583–587 (1995).

Weber, J. K. R. et al., "Containerless Liquid–phase Processing of Ceramic Materials," Microgravity Science and Technology, vol. 7, pp. 279–282 (1995).

Huang, C. M., et al., "Laser ablated coatings on ceramic fibers for ceramic matrix composites," Journal of Materials Science and Engineering, vol. A191, pp. 249–256 (1995).

Weber, J. K. R., et al. "Effects of Melt Chemistry on the Spectral Absorption Coefficient of Molten Aluminum Oxide," Journal of the American Ceramic Society, 78, pp. 3067–3071 (1995).

Biswas, A., Weber, J. K. R., and Nordine, P. C., "Removal of residual chromium from aluminum oxide by containerless liquid–phase processing," Journal of Materials Research, vol. 10, pp. 1823–1827 (1995).

Weber, J. K. R., Felten, J. J., and Nordine, P. C., "Laser hearth melt processing of ceramic materials," Rev. Sci. Instrum. 67, pp. 522–524 (1996).

Weber, J. K. R., Felten, J. J., Cho, B., Nordine, P.C. "Glass Fibres of Pure and Ebrium–or Neodymium–Doped Yttria–Alumina Compositions," International Magazine Nature, pp. 769–771, Jun. 1998.

* cited by examiner

US 6,484,539 B1

GLASS FIBER HAVING COMPOSITIONS OF ALUMINA-LANTHANA AND MADE FROM UNDERCOOLED MOLTEN MATERIALS

CROSS-RELATED TO RELATED APPLICATIONS

This Application claims the benefit of U.S. Provisional Application No. 60/009732, filed on Jan. 11, 1996. This Application is a continuation-in-part of U.S. patent application Ser. No. 08/807,580, filed on Jan. 9, 1997.

FIELD OF THE INVENTION

The invention pertains to novel methods for drawing fibers from liquid melts, including those composed of materials whose liquid state viscosity at the melting temperature is normally too low to accommodate fiber drawing operations. The invention also pertains to methods of drawing fibers from a melt while preventing recrystallization of the melt. Further, the invention pertains to methods of controlling heat transfer at melt surfaces so that a portion of the melt is undercooled to a temperature below the equilibrium melting temperature, and fibers can be drawn from the undercooled portion of the melt. The invention also relates to the production of novel fibers including but not limited to fibers of glass and crystalline materials, glass fibers formed using the methods of the invention, and fibers of high tensile strength compared to fibers of the same composition which are currently commercially available.

BACKGROUND OF THE INVENTION

Melt-Drawn Fibers

The drawing of fibers from liquid melts is well known in the art as an inexpensive method of fiber synthesis. This process is possible if the liquid viscosity is (1) sufficiently high so that tensile forces overcome the surface tension forces of the liquid during the fiber drawing process, and (2) sufficiently low so that the tensile forces induce liquid flow into a thin fiber rather than bulk flow of the liquid.

Drawing is widely used to make fibers from materials that form viscous melts, such as but not limited to oxide compositions that contain a high concentration of silicon dioxide and polymeric materials. The silica glass fibers and polymeric fibers have considerable economic utility as, for example, thermal insulation material, components in composite materials, use in textiles, and for many other applications. Fiber-drawing is used to make glass fibers for applications such as, for example, fiber lasers and fiber-based optical devices. These glass fibers typically contain small concentrations of optically-active dopant elements which are added to the host glass, such as neodymium (Nd) in Nd-glass lasers and erbium (Er) in Er-glass lasers. The magnitude and the uniformity of the dopant concentration in the fibers are limited, however, by the solubility and diffusivity of the dopant oxides in a preform of the host glass material during the doping operation that occurs prior to fiber drawing from the preform.

In some cases, mixtures of several pure materials yield melts from which fibers can be drawn. For example, fluoride glass fibers are made by melt drawing from mixtures of several metal fluorides that exhibit a low melting temperature, thereby forming relatively viscous melts. Fluoride glass fibers provide optical transmission outside the bandwidth of silica-based fibers, and are of interest for applications such as fiber-laser and infrared waveguide applications. However, considerable difficulties generally attend the manufacture and use of most fluoride fibers, such as brittleness, moisture sensitivity and toxicity. In addition, many mixtures of fluoride materials or pure liquid fluorides have insufficient equilibrium melting temperature viscosities for fiber drawing operations. Improved alternatives to these prior art fluoride fibers are needed. As used herein, the "equilibrium melting temperature", "or the melting temperature" of a melt is the temperature at which at equilibrium, all of the melt components of a system are substantially liquid.

It is the temperature, at the prevailing ambient pressure and for a system whose chemical composition is equal to the chemical composition of the melt of interest, for above which no crystalline phases occur in a system at equilibrium.

Oxide glass fibers are often made from mixtures of silicon dioxide, boron oxide, sodium oxide, and other additives, which mixtures melt at temperatures much lower than the melting temperature of pure silica and result in melts sufficiently viscous for the drawing of fibers.

Fibers known as chalcogenide glass fibers can also be drawn from mixtures of elements such as germanium, arsenic, antimony, selenium, tellurium, and others which form viscous, low melting temperature liquids. Chalcogenide glass fibers have application in the transmission of infrared radiation. However, many chalcogenide materials have equilibrium melting temperature viscosities which are too low to accommodate fiber drawing operations.

Prior art methods also limit the concentrations of additives that may be achieved in glass fibers. For example, optically-active additives for fiber laser and fiber laser amplifier applications are generally introduced into preformed host glass fibers by heating the host fiber in the presence of the additive materials, which are generally applied to the outside of the drawn fiber (such as, for instance, by spraying). With this method, the additive concentration in the fiber is limited to the equilibrium solubility of the additive material at the heating temperature. Fibers made by this process, however, suffer from the drawback that the heating temperature, and therefore the additive concentrations, are limited by crystallization of the host fiber.

Drawn or extruded fibers are also used as precursor fibers in chemical or physical processes that change the fiber material into a different chemical form or physical state. For example, sol-gels formed from metal-organic chemicals can be drawn or extruded into fibers of an amorphous material that is subsequently heated to decompose the organic fraction of the fiber and produce polycrystalline oxide fibers. Silicon-containing organic polymer materials can be drawn into fibers and subsequently decomposed to form silicon carbide fibers. Organic polymer fibers made from polyacrylonitrile (PAN) are heated and decomposed at high temperatures to obtain carbon fibers. Pitch compositions obtained from hydrocarbon or coal tars can be drawn into fibers and subsequently decomposed at high temperatures to obtain carbon fibers. Polycrystalline oxide fibers of various materials such as zirconia-silica materials, alumina-boria materials, alumina-silica materials, and yttria-alumina materials have been made from precursor fibers that are formed by drawing or extrusion processes.

Prior art methods of fiber manufacture include drawing fibers from undercooled melts. As used herein, an "undercooled" temperature refers to a temperature which is below the melting temperature of the combined melt components. For instance, the melting temperature of aluminum oxide is 2050 degrees C. An undercooled melt of aluminum oxide would be a liquid melt held at a temperature below this. Fibers containing one or more of calcium oxide, aluminum oxide, silicon dioxide, magnesium oxide, and/or barium oxide have been drawn by conventional means utilizing partial undercooling by melting the starting materials in a platinum crucible or by melting the end of a rod of the starting material, removing the source of heating allowing the melt to cool, contacting the undercooled surface of the liquid with a glass rod, and manually drawing a fiber from the undercooled surface of the liquid by withdrawing the glass rod and attached fiber. Alternatively, the center section of a rod of the starting material is melted, the heating source is removed, and a fiber is formed when the two ends of the rod are manually drawn apart. Reportedly, fibers could be drawn using these methods from melts that contained a maximum of 46.2% aluminum oxide by weight, which is equivalent to a maximum of 35.3 molar % of aluminum oxide, $Al_2O_3$. However, it is reported that melts which contain more than 50% aluminum oxide by weight have much lower viscosities, and fibers of these higher-alumina composition materials could not be drawn from melts using these prior art techniques, even when the drawing portions of the melts were undercooled.

The methods described above are limited in part by the fact that the melt is in contact with a solid rod of the same material or with a platinum container. As the melt cools, crystals propagate from the solid/liquid interface to consume the liquid portion and thus limit the duration of time the melt remains liquid for fiber drawing. A second limitation of using traditional methods is that fibers cannot be drawn from the melt for binary $Al_2O_3$—CaO compositions, but only for compositions with at least 3.5% by weight of added silicon oxide or with 17.8 weight % of added barium and magnesium oxides. Finally, fibers cannot be drawn using these methods from melts containing a binary mixture of 50 molar % calcium oxide and 50 molar % aluminum oxide, i.e., the chemical composition $CaAl_2O_4$, because the viscosity of such melts is too low to permit the drawing of fibers by the prior art methods described above.

In general, the melts formed at the equilibrium melting temperature for the vast majority of pure materials are of a viscosity that is too low to support fiber drawing operations. The number of "superheated" (melt temperature above the equilibrium melting temperature) molten materials having viscosities sufficiently large for fiber drawing is also limited.

In a typical fiber drawing operation, the melt must be of sufficiently high viscosity to enable fibers to be drawn from the melt. In general, the nominal viscosity required for fiber drawing from the liquid is from approximately 1,000 to 1,000,000 poise. Viscosity values for most liquids, however, are much lower than those required for fiber drawing. For example, typical viscosities are 0.01 poise for water, 1–100 poise for molten oxides and slags that do not contain silicon dioxide, 0.01 to 0.1 poise for molten salts, 0.01–1 poise for metals and alloys.

As discussed above, undercooling is one method sometimes used to increase the viscosity of a melt. At least slight undercooling can be achieved in most liquids. However, where a liquid melt is cooled in contact with a solid container, the container may induce the nucleation of solid material from the liquid melt, resulting in the solidification of the entire mass of the melt. In addition, contact with a container can introduce impurities into the melt, as a result of dissolution of the container material into the melt. Such contamination of melts by contact with a container is a problem in, for example, the fabrication of fluoride glass and chalcogenide glass fibers used for transmission of infrared light, in the fabrication of high purity fibers, and in the fabrication of high melting temperature materials intended for service in high temperature structural applications. In addition, contact with a container may also induce crystallization of the melt.

As a result of the low viscosity of many liquids and because crystallization due to contact with containers limits undercooling, there is traditionally a very limited range of materials from which fibers can be made by drawing from a liquid melt placed within a container.

In addition to undercooling, a second method of increasing the viscosity of a melt is by adding viscosity enhancers such as $SiO_2$ to the melt. Some liquids containing silicates have a high viscosity and an ability to be undercooled without recrystallization, i.e., to be cooled below the melting temperature without undergoing spontaneous recrystallization. The ability to undercool such materials facilitates the drawing of fibers, since the viscosity of the liquid melt may be increased by decreasing the temperature of the melt to a value at which the optimum drawing viscosity is obtained.

The utility of silicate fibers is limited, however. For example, the presence of silicon oxide in the silicate fibers leads to increased absorption of infrared radiation relative to fluoride materials, chalcogenide materials and to other oxide materials such as aluminum oxide or yttrium-aluminum oxide, the silicates do not conduct electricity, the silicates limit laser action of laser active dopants, and the silicates may be chemically reactive towards matrix materials in high temperature composite materials. These and other limitations inherent in silicates have led to the development of many alternative fiber forming methods, some of which are described below.

Containerless Systems for Melt-Drawn Fibers

Another means of increasing the range or the purity of materials from which drawn fibers may be produced is to use a containerless system. Containerless systems typically involve the levitation of a liquid drop, or small amounts of solid material, by generating forces on the levitated specimen which compensate for the force of gravity. The forces used to levitate the specimens may be produced by aerodynamic, electromagnetic, acoustic, electrostatic and any other means or combination of means of levitating specimens.

One such containerless system involves separating the liquid from the surface of a container used to shape, position, or mold the liquid. The separation occurs by means of a gaseous film formed by gas permeating through the wall of the container. This method is generally applicable to relatively large masses of liquid. This method has been used to levitate molten mixtures of metal fluorides and to draw fibers from the fluoride melts, whose viscosity is sufficiently high at temperatures above the equilibrium melting temperature to permit the drawing of fluoride fibers. In this way, fluoride fibers of a greater purity are obtained than would be possible if the melts were held in a container, which would dissolve when exposed to the corrosive fluoride liquid and contaminate the melt.

Another containerless system for drawing fibers involves use of a levitation furnace apparatus which levitates a material, heats and melts the material, initiates drawing of the material and results in the drawing of a fiber from the levitated liquid, which is cooled as it is drawn from the levitated liquid.

Yet another system involves an apparatus and method for drawing optical glass fibers from the molten tip of a glass precursor in a self-supported, containerless environment. The method employs melting of the glass precursor rod in a temperature gradient furnace such that a liquid drop forms at the end of the rod and a fiber is drawn from the melt. The process, however, requires a microgravity environment, and is not useful for melts which exhibit low surface tensions.

Containerless conditions may, also be obtained by the use of an aero-acoustic levitator ("AAL"). An AAL levitates the-liquid drops from which fibers may be drawn by the use of aerodynamic forces from a gas jet, and the levitated sample is stabilized by application of acoustic forces from a three-axis acoustic positioning system. This method is generally used to levitate specimens with diameters in the range of approximately 0.25 cm to approximately 0.35 cm, although larger and smaller specimens may also be levitated by using this method.

Devices used to levitate 0.25 to 0.40 cm diameter specimens include, for example, conical nozzle levitation ("CNL") devices in which a levitation gas flow passes through a plenum chamber, through a nozzle and over the specimen, levitating the specimen. The levitated specimen is then heated and melted with a laser beam.

Other Fiber-Forming Methods

In addition to drawing fibers, several other processes have been developed to form fibers from low viscosity melts. One such process is the "edge-defined film-fed growth technique," in which a single crystal fiber is formed by crystallization of liquid. The diameter of the fiber formed is determined by interfacial forces and by the diameter of a small orifice in the container that supplies the liquid.

Another process is the "pedestal growth technique." In this process, the end of a small rod of starting material is melted by the application of focused laser beam heating, and a smaller diameter single crystal filament is drawn from the melt. Careful control of the linear growth rate of the filament and of the heat transfer conditions at the point of crystallization allows fibers to be formed by crystallization of the melt. An advantage of this process relative to the edge-defined film-fed growth technique is that higher purity materials can be made because no container is required.

The materials to which the edge-defined film-fed growth technique and the pedestal growth technique have been applied include aluminum oxide, yttrium aluminum garnet, ceramic superconductor materials, and others. Single crystal filaments are obtained, with chemical compositions of the fibers equal to the chemical composition that is in equilibrium with the melt. The resulting fibers are typically of 50–100 micrometers ("$\mu$") or larger in diameter and the linear growth rates at which the fibers are formed are typically less than 1 cm/second. In contrast, however, non-crystalline fibers drawn from viscous melts can be made with diameters less than 1 micrometer or larger, and the fibers are formed at very high rates of several hundred cm/second.

Yet another process for forming fibers and filaments from melts of low viscosity employs extrusion of the liquid as a free stream into an atmosphere which forms a stabilizing film on the stream, after which solidification occurs within the stabilizing film. For example, low viscosity melts may be extruded into a hydrocarbon atmosphere where a solid carbon film is formed on the liquid stream. However, the fibers formed by this method are contaminated by the carbon sheath, which must be removed in subsequent processes, and may also be contaminated by interaction with the container material.

In addition, the technique of-chemical vapor deposition ("CVD") has been used to form small diameter filaments of one material deposited on a core fiber of another material. Examples of commercially available CVD filaments are boron filaments deposited on thin tungsten substrate fibers and silicon carbide filaments deposited on carbon fiber substrates. These filaments are typically of 100 micrometers in diameter or larger. Laser CVD also can be performed in which fibers are formed at the focus of a laser beam, inside a CVD reactor. Laser CVD has been used to make pure fibers of boron, silicon carbide, silicon nitride, silicon, germanium, and carbon, with diameters of approximately 10 micrometers or larger. However, Laser CVD is a slow process in which the fibers are formed at linear growth rates of 0.1 cm/second or slower.

It thus would be advantageous to have a method for drawing fibers from materials which exhibit insufficient viscosities to permit fiber drawing at their equilibrium melting temperature. It would be additionally advantageous to have drawn fibers from materials which in the prior art are thought to be incompatible with a conventional fiber-drawing process. Additionally, it would be useful to have a means of minimizing recrystallization of molten materials during fiber drawing. Still further, it would also be advantageous to produce novel fibers from melts containing dissolved additives in larger concentrations than previously available in drawn fibers produced by conventional "doping" operations, including fibers with additives whose concentrations exceed the equilibrium concentration of the additives in the fibers at the fiber crystallization temperature. Lastly, it would be advantageous to have a means of producing crystalline fibers with controlled chemical compositions.

BRIEF DESCRIPTION OF THE INVENTION

The present invention provides a method for drawing fibers from liquids which exhibit insufficient viscosities for fiber drawing at and above the equilibrium melting temperatures. Further, the present invention provides novel draw fibers from materials which were thought to be incompatible with a fiber-drawing process. The present invention also provides a means of minimizing recrystallization of a bulk melt during fiber drawing. Still further, the present invention provides novel drawn fibers with high concentrations of additives as compared to conventionally drawn prior art fibers, including fibers with additives whose concentrations exceed the equilibrium concentration of the additives in the fibers at the fiber crystallization temperature. In addition, the present invention provides fibers of a higher tensile strength than prior art fibers of the same composition. Lastly, the present invention provides a means for producing crystalline fibers with controlled chemical compositions.

The present invention achieves these objectives by heating the desired materials until completely melted thus forming a melt, undercooling the melt until the proper viscosity is reached and maintaining the melt at the undercooled temperature, initiating fiber drawing by inserting a "stinger" into the melt and rapidly withdrawing the stinger from the melt, then finally drawing the fibers at the desired speed so that fibers of the desired composition and diameter are formed. If desired, crystalline fibers can be formed by heating the drawn fibers until crystallization occurs. The present invention also provides for drawing fibers from an undercooled melt held under either containerless conditions or within a container. As used herein, the term "undercooled melt" refers to a melt or a portion of a melt that is held at an undercooled temperature (i.e., at a temperature below the melting temperature) during fiber drawing operations.

DETAILED DESCRIPTION OF THE PREFERRED EMBODIMENTS

Figure 1:
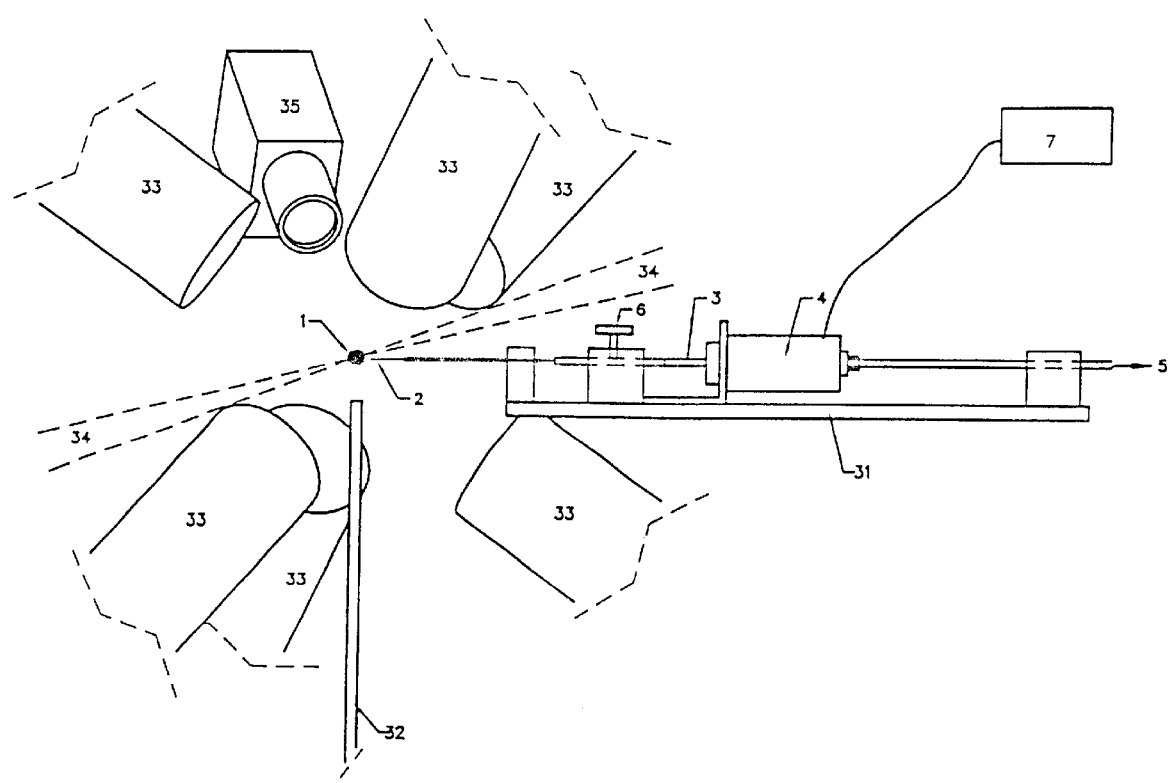
FIG. 1 is a schematic diagram of an embodiment of the fiber stinger-drawing system in accordance with the principles of the present invention.

Surprisingly, we have discovered that the undercooling of certain liquid melts under controlled conditions and maintaining at least portions of the melts in an undercooled state during fiber drawing provides melts of sufficient viscosity to enable fiber drawing without complete recrystallization of the bulk liquid, even for melts with viscosities at the equilibrium melting temperature that are too low to allow fiber drawing operations by conventional means. Described herein are examples of fibers drawn from undercooled melts of several oxide materials for which fibers could not be drawn from the melts at or above the equilibrium melting temperature.

Also surprisingly, utilizing the methods of the present invention such as maintaining the melts in an undercooled state, fibers were readily drawn from melts under undercooled conditions of temperatures up to and exceeding 30% below the equilibrium melting temperature, and from melts with viscosities at the equilibrium melting temperature in a range from less than 1 poise to at least 100 poise. Also surprisingly fibers may be drawn from undercooled melts of chemical compositions which contain higher concentrations of additives than are present in prior art fibers drawn from such melts, typically in the range of concentrations from less than 0.0001 molar % to 50 molar % of the melt composition. Such additives include but are not limited to materials which absorb and emit specific wavelengths of light ("optically active" additives), such as erbium or neodymium. In addition, fibers drawn according to the methods of the invention have surprisingly high tensile strengths, hypothesized to be due to the relatively unflawed surface of the fibers of the invention.

The methods of the invention utilize a "stinger" to initiate the draw. The ability to grow fibers is significantly influenced by the physical properties of the stinger, and by several conditions under which the stinger is used, such as the material, dimension, surface finish, depth of insertion of the stinger tip in the liquid, and the residence time of the stinger in the liquid before drawing is initiated. The control of these properties and processes influences the surface wetting and adhesion and allows for considerable control over the fiber drawing process.

Briefly described, the steps of the present method of the invention include (i) melting specimens of selected materials under either containerless conditions to create suspended liquid drops or under contained conditions such as, for example, in a crucible; (ii) cooling the liquid to a temperature below the equilibrium melting temperature of the melt components, i.e., to undercool the liquid; (iii) maintaining at least part of the liquid in an undercooled state, and (iv) contacting the undercooled liquid with a stinger and withdrawing the stinger under appropriate conditions to draw a fiber from the undercooled liquid. Such conditions include but are not limited to the rate at which the stinger is withdrawn from the melt, the melt temperature and the chemical composition of the ambient gas environment.

In all cases, control of the fiber diameter is obtained by controlling (i) liquid viscosity (by changing the melt temperature and/or the gas environment), and (ii) the fiber drawing rate. Gases used in the experiments described below include, for example, oxygen, air and argon, although other gases such as, for example, nitrogen, helium, carbon monoxide, carbon dioxide, hydrogen and water vapor may also be used. In general, faster drawing rates and/or smaller viscosities favored smaller diameter fibers. The upper limit to the fiber diameter was determined by the minimum drawing rate that could be used without inducing crystallization in the bulk undercooled melt. The lower limit to the fiber diameter was determined by the maximum drawing rate that could be achieved without breaking the fiber or drawing it out of the melt.

Additionally, glass fibers drawn in accordance with the methods of the invention may be converted to crystalline fibers by heating the glass fibers to a temperature at which crystallization of the particular glass occurs.

The invention permits high purity fibers to be manufactured from a number of materials that are known to exhibit high strength and stiffness, low creep rates, high oxidation resistance, or chemical compatibility with the components of composite materials at high temperatures. It allows fibers to be formed from materials that exhibit low absorption of electromagnetic radiation, such as but not limited to those used in telecommunications applications, and as fiber optic light guides, and from high purity materials. The invention also allows synthesis of substantially homogeneous glass fibers which may include high concentrations of dopant elements (such as optically active additives) as compared to conventionally drawn fibers, for uses such as but not limited to fiber laser and fiber laser amplifier applications. The fibers of the invention may be drawn rapidly, enabling less expensive production of fibers, and may be crystallized to form stable materials which may be used, for example, in oxidation-resistant composite materials with very high temperature structural applications such as turbine combustion chamber liners and thrust deflectors. The invention also allows the synthesis of fibers with improved tensile strength and stiffness for use in polymer-matrix composite materials applications. In addition, the invention allows fibers to be formed from bio-compatible materials for in vivo medical applications. Thus, the present invention greatly expands the range of materials that can be made into fibers by drawing from liquid melts.

It is important to note that an important feature of the invention is the use of the stinger to initiate fiber drawing. The fibers of the invention are not "formed" by dies or extrusion means, but are instead pulled by the stinger without physical forming devices. This free-form drawing minimizes introduction of impurities by the forming devices, and assists in controlling recrystallization of the undercooled liquid.

EXAMPLE 1

Fiber Drawing Device

FIG. 1 depicts a preferred arrangement for drawing fibers from undercooled melts, under either contained or containerless melt conditions, utilizing the principles of the present invention. In this Example, containerless conditions are pictured, although the principles and the fiber drawing invention may be used with any melt from which drawn fibers are desired, including contained melts.

The containerless conditions pictured in FIG. 1 are obtained by use of an aero acoustic levitator to levitate liquid drops from which the fibers are drawn. This method utilizes aerodynamic forces from a gas jet 32, and the levitation is stabilized by application of acoustic forces from a three-axis acoustic positioning system 33. This and other means of levitating samples are described in the prior art, and the use of any means of levitating undercooled sample are intended to be within the scope of the invention. Such methods include, for example, electromagnetic levitation and electrostatic levitation. These means involve levitation and maintenance of the melt under high vacuum conditions or in an inert environment, which allows for ready application of the fiber drawing methods of the invention to metals, alloys, and materials that are sensitive to reaction with air or gaseous species present in a gas environment.

A levitated liquid drop 1 is formed by heating and melting a sample with the beam from a $CO_2$ laser, although it is contemplated that any heating means is within the scope of this invention, for example, incandescent or arc lamps, microwave heating, induction heating, furnaces or levitation in a hot gas stream. In addition, any laser beam capable of providing sufficient heat to the sample may be used with the method of the invention. In this particular example, the $CO_2$ laser beam is split into two beams 34 that are focused onto opposite sides of the levitated sample, causing the sample to melt. The melt is then held at high temperatures until fully melted, and undercooling of the molten drop is then induced and maintained by switching off or reducing the incident heating power.

A stinger and fiber drawing device 31 consisting of a 0.01 cm diameter tungsten wire stinger 2 attached to a rod 3 which is operated with a solenoid actuator 4 positioned so that the tip of the tungsten wire stinger is inserted into the levitated liquid drop 1 when the solenoid is actuated. Contact between the tungsten wire stinger and the undercooled melt must be carefully controlled to avoid heterogeneous nucleation of crystals in the undercooled melt due to contact with the stinger. While nucleation is not generally induced by the fiber drawing operation of the invention, problems related to heterogeneous nucleation may be alleviated if previously formed glass fibers are used as the stinger material. Although a tungsten wire is used as the stinger in this embodiment, the invention anticipates that stingers of various materials and sizes will be utilized depending upon the melt composition, viscosity and desired fiber characteristics, and such other stingers are within the scope of this invention.

In this Example, a spring-operated drawing mechanism 5 provides the drawing force for the drawing of fibers of defined lengths, although any means of drawing the fiber is within the scope of the invention. The drawing force of the spring is adjusted so that its force constant is in the range k=0.1–0.25 lb/in. The fiber drawing rate is further controlled by a friction damper 6. An electronic control circuit 7 is used to initiate the solenoid actuator and hold the stinger in the liquid drop for a preset time before it is released to allow the fiber drawing operation. A high speed pyrometer 35 is used to monitor the levitated sample temperature which can be displayed in real time on a computer screen, as a graph of temperature vs time. The temperature of the molten drop is maintained at the desired undercooled temperature by increasing or decreasing the intensity of, or time of exposure of the sample to, the laser beam.

Of course, it is intended that that the force constant of the spring and the fiber drawing rate may be adjusted as necessary in order to achieve fibers of the desired dimensions. In addition, it is intended that the fiber drawing means may be any suitable means, for instance, a motor and wheel assembly, and that the force of the drawing may be adjusted according to the physical properties of the fiber desired and the method used to draw the fibers.

Fiber drawing is initiated by first blocking the laser beam heating and monitoring the temperature of the liquid drop as it cools (displayed as a plot of temperature versus time on the computer screen). The solenoid actuator 4 is manually activated when the temperature reaches a pre-selected value, which is preferably within the optimal drawing temperature range. In this particular embodiment, the solenoid is designed to automatically turn off after stinging the specimen. The stinger is then withdrawn by action of the drawing mechanism, and a fiber is drawn from the liquid drop. The control of the temperature of the liquid drop is a critical part of the method of the invention. At temperatures higher than optimal temperature range for drawing fibers, the stinger is drawn out from the liquid drop without drawing a fiber. At temperatures lower than the optimal temperature range, the viscosity of the liquid is so high that the force exerted by the stinger on the liquid drop exceeds the restoring forces of the levitation device, and the stinger motion serves to push or draw the liquid drop out of the levitated position rather than drawing a fiber from the liquid. In addition, if the melt temperature is too low the resultant fibers will be shorter than desired. At intermediate, undercooled temperatures, fibers of various lengths may be formed, with diameters ranging from less than 1 micrometer to over 60 micrometers.

While a certain range of fiber sizes is reported in this example, it is contemplated that fibers with a wide range of sizes may be produced, depending upon the drawing conditions. The diameter of the fibers is larger when drawing occurs at a lower velocity. The diameter of the fibers is smaller when drawing occurs at a higher velocity. The length of the fibers are limited by two effects. First, at lower temperatures, the forces on the liquid drop will eventually pull the liquid drop out of its levitated position. Second, at higher temperatures, the fiber diameter decreases as the pulling rate increases so that the tensile forces no longer overcome the surface tension forces and the pulling of a fiber from the liquid is terminated. Within the proper drawing temperature range, fibers of extremely long lengths may be drawn. For example, drawing a 10 micrometer diameter fiber until a 0.35 cm diameter drop is reduced to 0.25 cm diameter results in a fiber which is more an 18,000 cm long.

Figure 2:
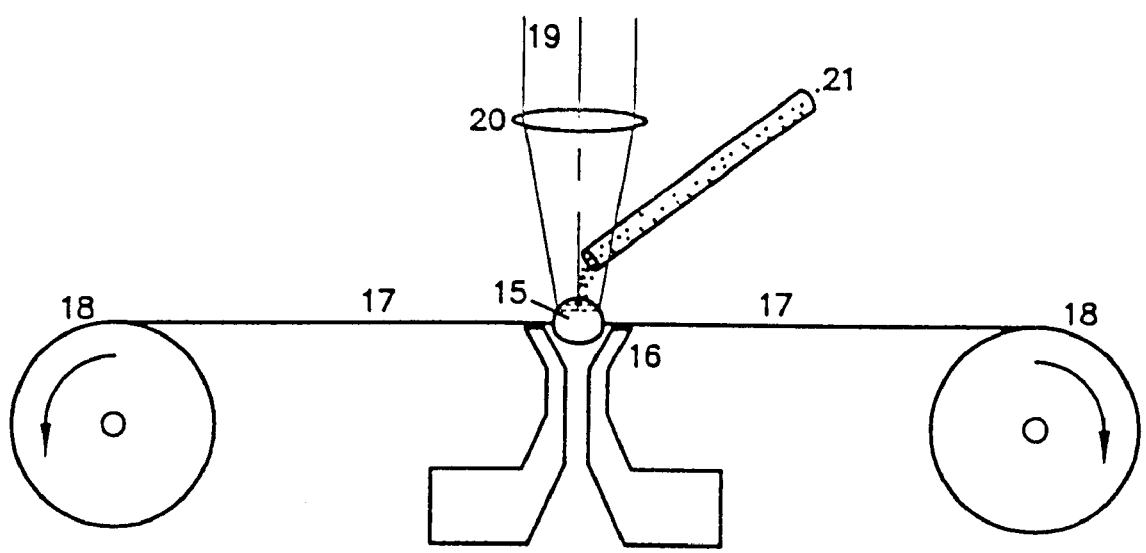
FIG. 2 depicts an embodiment of a method in accordance with the principles of the present invention for drawing fibers in opposite directions from an undercooled and levitated melt.

FIG. 2 illustrates a preferred method in accordance with the principles of the present invention of drawing fibers from more than one direction from a suspended liquid drop under containerless conditions. In this method, a levitated liquid drop 15 is initially formed in a levitation nozzle 16 or using another levitation melting technique. Fibers 17 are simultaneously drawn in opposite directions from opposite sides of the liquid drop by the action of motors and wheels 18 or other drawing devices that will allow control of the stinger operation and the fiber drawing rate. The drawing forces are opposed and can be controlled to make them nearly equal and opposite so that the resulting force on the liquid drop will be reduced and the drop will not be drawn away from its initial position. The figure also illustrates heating by a laser beam 19 or other radiant heat source that is focused with a lens 20 onto the top surface of the levitated liquid drop. The temperature in the heated region can be maintained above the melting temperature, while the temperature will decrease in other regions of the liquid drop, and can be undercooled at the sides of the liquid drop sufficient to permit fiber drawing. The fiber material removed from the drop can be replenished by adding and melting solid material 21 in the radiantly heated region, which may be added to the levitated liquid in controlled rates as a stream of powder or one or more thin rods of solid material. By incorporating control of the fiber drawing rate, addition and melting of material at the radiantly heated region, maintaining an undercooled region from which to draw fibers, a continuous process can be achieved to make long and continuous fibers. Of course, the invention contemplates the drawing of single fibers from a single direction or the drawing of multiple fibers from multiple directions drawn from positions which do not significantly displace the melt from its levitated position.

Stinger conditions and operation include priming the stinger by contact with the melt at temperatures above the melting temperature prior to its use in drawing-fibers from the undercooled melt, and the time that the stinger is allowed to be in contact with the molten drop (typically 1–50 milliseconds, although the priming time may vary depending upon the stinger, composition of the melt and viscosity of the melt), the distance the stinger is inserted into the melt and the rates of stinger insertion into, and withdrawal from, the melt. If the temperature is too high, nucleation by the stinger may be avoided by rapid insertion/withdrawal of the stinger, but the velocity of drawing must not be too high to draw a fiber from the melt. At the appropriate undercooled temperature, the viscosity of the melt increases to where fibers may be drawn, and the rate of crystallization decreases to a rate lower than that observed near the melting temperature of the material.

EXAMPLE 2

Fiber Drawing Using the Conical Nozzle Levitator

Figure 3:
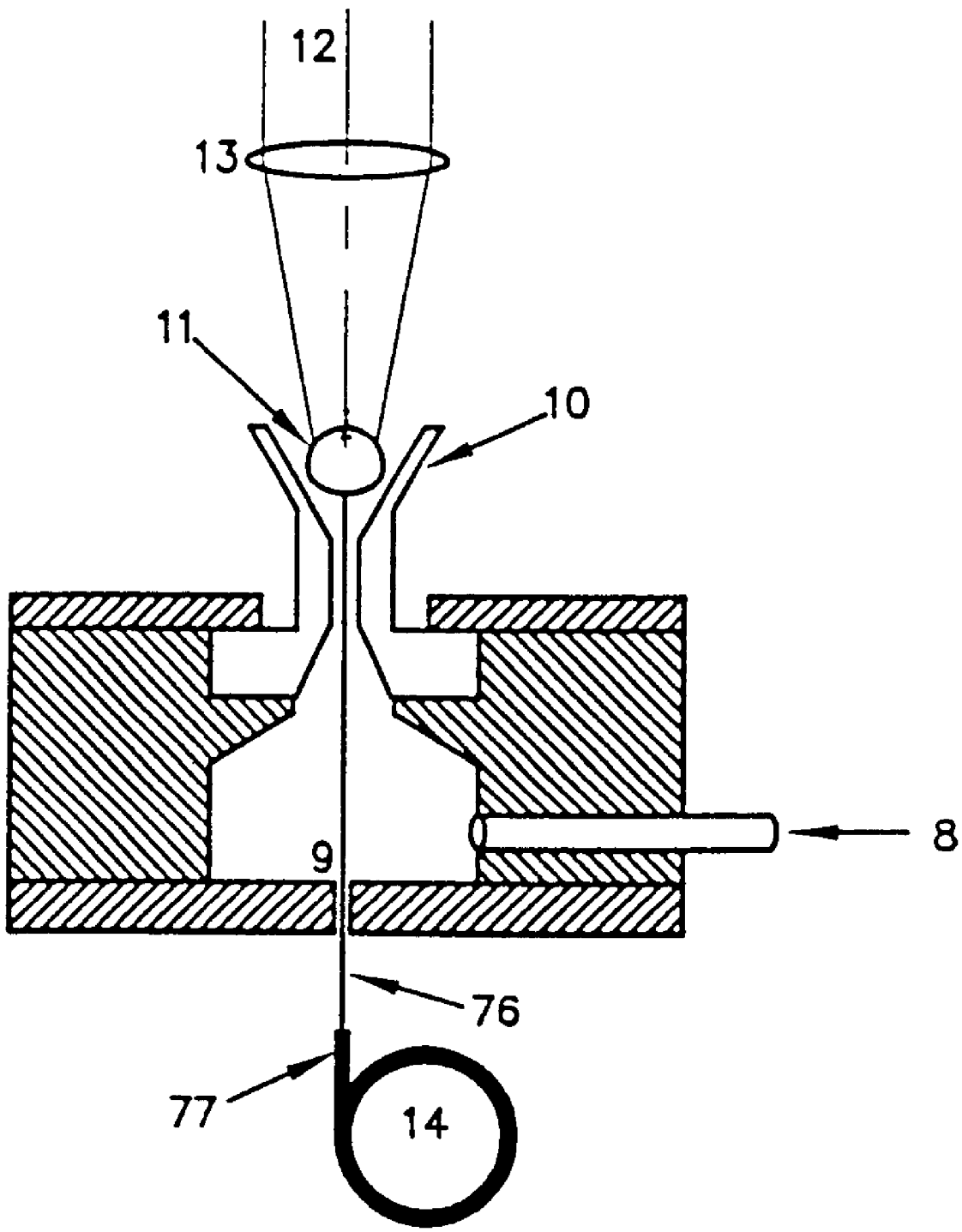
FIG. 3 depicts an embodiment of a method in accordance with the principles of the present invention for drawing fibers from an undercooled melt maintained in a conical nozzle levitator.

FIG. 3 shows the arrangement for drawing fibers from melts using a motor and wheel assembly and a conical nozzle levitation (CNL) device, to levitate and draw fibers from 0.25–0.40 cm diameter specimens although smaller specimens may also be levitated and larger specimens may be levitated depending upon their surface tension and density. A levitation gas flow 8 passes through a plenum chamber 9, through the nozzle 10 and over the levitated specimen 11. The levitated specimens are heated and melted with a $CO_2$ laser beam 12 focused with a ZnSe lens 13 onto the top surface of the specimen. The temperature of the specimen is controlled by blocking the laser heating beam using any available means of signal blocking or by changes in the laser power. Fibers 76 are drawn from the bottom surface of the undercooled melts, using a tungsten wire stinger 77 that is fed through the nozzle and driven by a reversible stepper motor and wheel assembly 14. The stinger comprises a long tungsten wire attached to the wheel, which is wound onto the wheel as the fiber pulling occurs. Of course, it is contemplated that other lasers may be used to heat the specimen, for example, a continuous wave Nd-yttrium-aluminum-garnet (Nd-YAG) laser. Of course, any heating method, in addition to lasers, may be used which will effectively melt the materials and not interfere with the drawing operation. It is also contemplated that any means of powering the drawing process may be used, in addition to the stinger method of Example 1 and the stepper motor and wheel assembly described above.

The direction and acceleration of the motor and wheel assembly 14 are computer-controlled to operate the stinger, to vary the acceleration of the fiber pulling rate, and to achieve a constant fiber pulling rate. A high speed pyrometer is used to monitor sample temperature and observe cooling behavior. The stinger and resultant fibers are spooled onto the wheel attached to the motor 14, without undergoing further mechanical processing, such as drawing through a die. In this embodiment, fibers are drawn at velocities up to 120 cm/second, although the fiber-drawing velocity is dependent upon the individual means used to power the drawing (here, the motor and wheel). The acceleration of the stinger is computer controlled and an acceleration equal to 1200 $cm/sec^2$ is used, although the invention contemplates that other acceleration rates may be used depending upon the particular material to be drawn and the desired fiber characteristics. Fibers of up to 60 cm long and with uniform diameters of 5–20 micrometers may be drawn with this apparatus, although other lengths and diameters may be obtained by using different drawing conditions. The stinging and fiber drawing operation is typically completed in a period of less than 0.6 seconds, although the time may vary depending upon the viscosity of the melt, the rate of crystallization and the rate at which fibers are pulled. It is necessary to initially pull the fiber at a rate at which contact of the melt with the stinger does not induce crystallization of the melt.

Fiber drawing with the CNL device may be initiated and continued at lower temperatures than with the AAL device described in Example 1, above, because the liquid specimen is not drawn away by the fiber when the drawing force is large. At lower temperatures when the viscosity of the melt is larger, and at higher drawing rates where the fiber drawing force is larger, the drawing force becomes sufficient to displace the melt so that the melt makes contact with the sides of the levitation nozzle. Crystallization of the melt is induced by this contact with the nozzle, however, drawing of fibers continues until the melt crystallizes up to the point of fiber drawing. At temperatures where the drawing force is sufficiently large for the melt to make contact with the nozzle, the crystal growth rate was typically low enough so that the center of the specimen remains liquid for a period of time sufficient to draw continuous fibers of lengths greater than 60 cm.

For example, at lower temperatures where liquid drops of the mullite or yttrium-aluminum garnet (YAG) composition were displaced under a drawing velocity of 120 cm/second to make contact with the nozzle, the crystal growth rates are substantially less than 1 cm/second. The points of contact between the liquid and the nozzle were approximately 0.2 cm from the point at which fibers were drawn. Therefore, the fiber drawing continued for a period greater than 0.2 seconds after contact with the nozzle to yield fibers of lengths between 24 and 60 cm long. The approach of allowing the undercooled liquid to come in contact with a mechanical restraining device, as a result of displacement by the fiber drawing force, may thus be used to pull fibers of useful lengths. Surprisingly, crystals nucleated by contact with the mechanical restraining device propagate at limited rates and do not interfere with continued drawing of fibers until these crystals reach the point at which fibers are drawn from the liquid.

The cooling rate of the drawn strand may be estimated. For example, for a fiber which is 10 micrometers in diameter and drawn in air at a rate of 100 cm/second using the CNL device, the cooling rate is calculated as follows:

For example, consider a liquid oxide drop whose temperature is 1500 degrees C. The thickness of the thermal boundary layer at the liquid drop is considerably less than the specimen diameter at the stagnation point of the levitation gas flow, which is the same point at which the fiber was drawn from the liquid. For a typical 0.3 cm diameter liquid drop and 100 cm/second drawing rate, the fiber material was drawn through the boundary layer in less than 0.003 seconds. Assuming that the fiber material maintains thermal equilibrium with the gas, the cooling rate would be on the order of 500,000 degrees C./second. This cooling rate would occur if the heat flux at the fiber surface is approximately 700 watt/cm$^2$ as calculated from the enthalpy change rate of the 10 micrometer diameter fiber per unit surface area, and based on the thermal properties of aluminum oxide, for example.

Now assume that the fiber remains hot. The convective heat flux q" from a fiber at 1500 degrees C. to the cold ambient gas is given by:

$$q'' = \frac{Nu_h k_f (T_f - T_a)}{d}$$

where, $T_f$ and $T_a$ are the fiber and ambient temperatures, $k_f$ is the gas thermal conductivity at the mean gas "film" temperature=$(T_f+T_a)/2$, d is the fiber diameter, and $Nu_h$ is the Nusselt number for heat transfer.

For the assumed conditions $k_f$ is approximately $4\times10^{-4}$ watt/(cm degree C.), Nu is approximately 1, and q" is approximately 600 watts/cm$^2$. Thus, the assumption that the fiber does not cool leads to a heat flux comparable to that required to maintain thermal equilibrium with the ambient gas. It may therefore be concluded that the CNL fiber drawing method achieves cooling rates in the drawn fiber of several 100,000 degrees C./second for fibers of 10 micrometer diameter. For larger diameter fibers, the cooling rate is smaller, in approximate proportion to the square of the fiber diameter. Thus cooling rates in excess of 4,000 degrees C./second will occur for fibers of 50 micrometers in diameter.

EXAMPLE 3

Drawing Fibers from Mullite Melts

Figure 4:
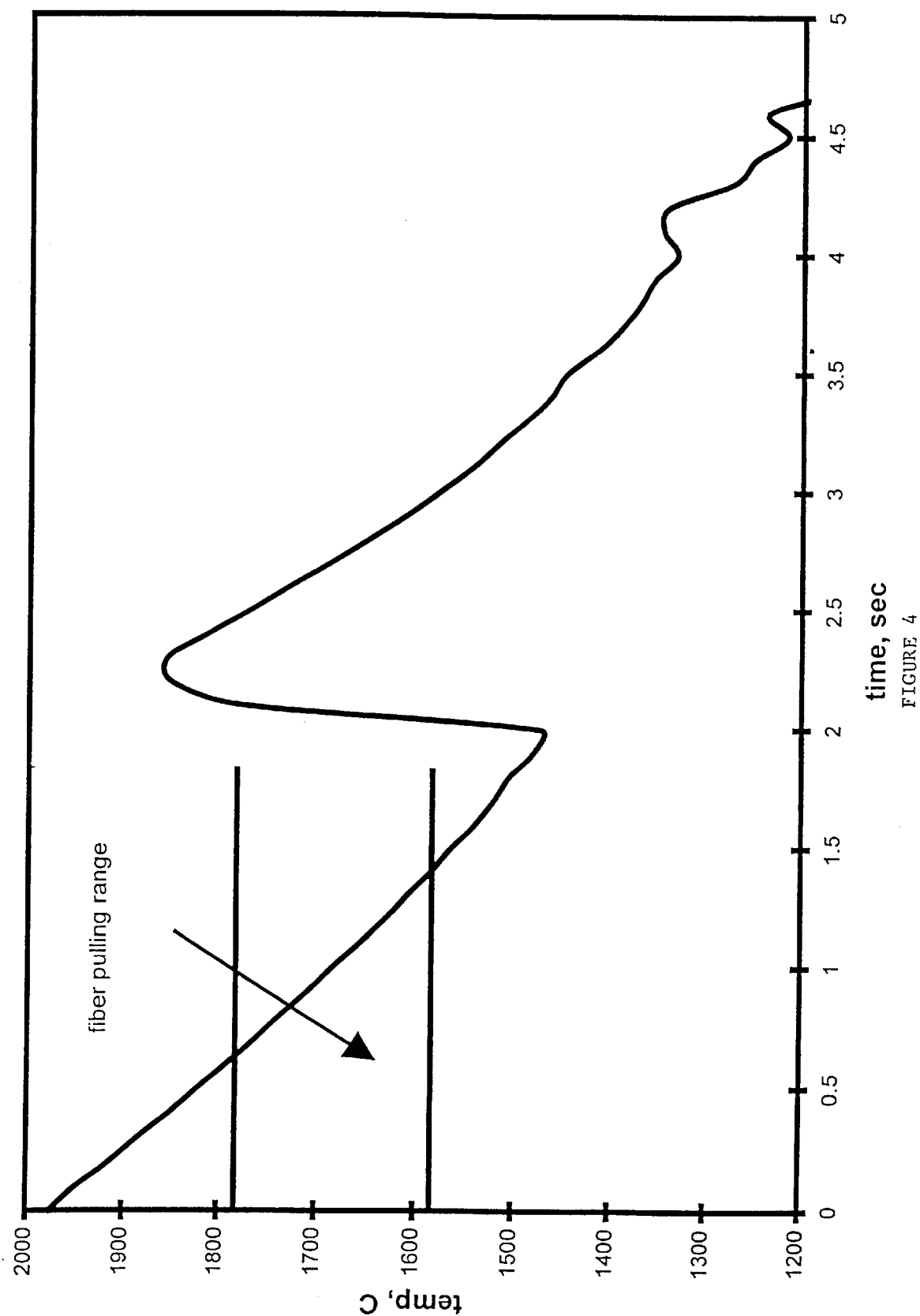
FIG. 4 is a diagram illustrating a typical cooling curve for a 0.3 cm diameter mullite specimen which was levitated and melted in an aero-acoustic levitator.

FIG. 4 illustrates the time and temperature conditions under which fibers are drawn from undercooled melts of the mullite composition, 60:40 mole fraction of $Al_2O_3:SiO_2$, using the fiber drawing methods of the invention.

FIG. 4 shows the typical temperature-time history of a levitated sample during fiber drawing experiments as a plot of the temperature measured with the optical pyrometer as a function of time. Prior to the illustrated time period, the specimen is melted with a $CO_2$ laser beam and simultaneously levitated in an AAL apparatus in a flow of argon gas, and held at a constant temperature. The temperature range for fiber drawing is determined by drawing fibers at various temperatures using the fiber stinging and drawing device illustrated in FIG. 1 and described in Example 1. The decrease in temperature with time from 0 to 2.0 seconds of the recorded time interval shows cooling of the liquid upon blocking of the laser heating beam. The temperature range in which fibers may be successfully drawn from the undercooled liquid during this cooling period is indicated on the figure. During the period approximately 2.0 to 2.2 seconds, a rapid temperature increase up to the melting temperature of the sample is shown. This temperature increase occurs when the undercooled liquid crystallized spontaneously. The energy released by crystallization is sufficient to heat the sample up to the melting temperature where the temperature remained approximately constant while crystallization continued. Finally, the temperature decreases due to heat loss from the solid specimen after all of the liquid is consumed.

Figure 7:
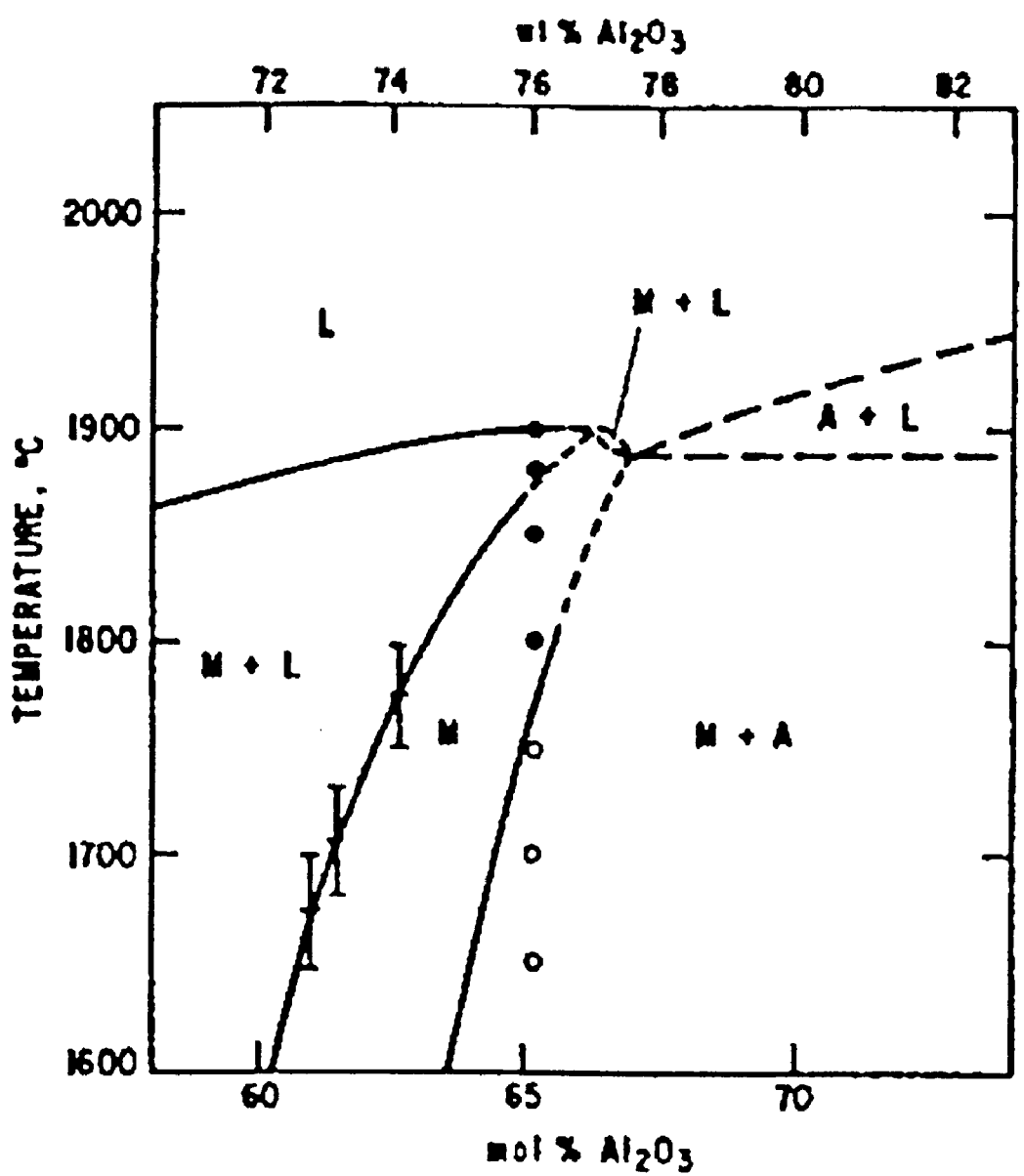
FIG. 7 is a portion of a typical alumina-silica phase diagram showing the behavior of mullite near the melting temperature.
Figure 8:
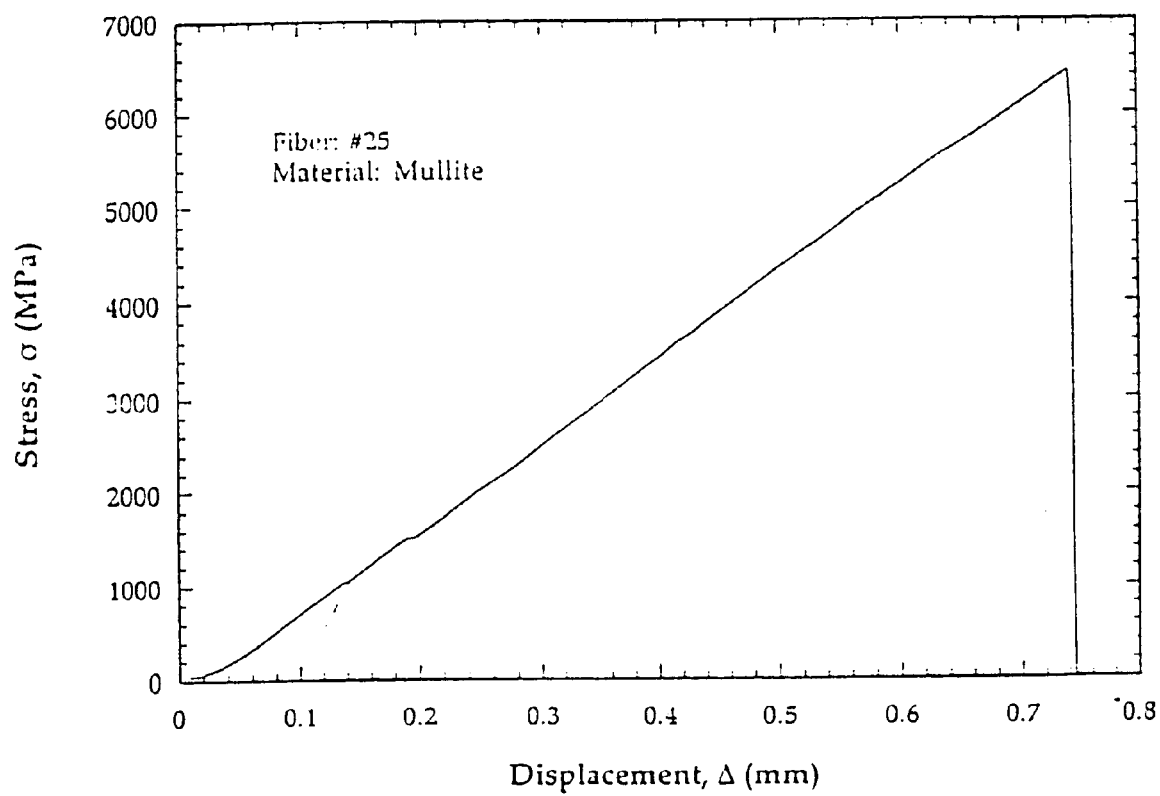
FIG. 8 is a graph depicting typical tensile testing results for a mullite-composition glass fibers.

As seen in FIG. 7, the composition of crystalline mullite that is in equilibrium with liquid at higher temperatures is not contained within the mullite phase field at lower temperatures. The diagram thus shows that mullite formed at equilibrium with the liquid at the highest temperatures will not be thermodynamically stable at lower temperatures. The mullite in equilibrium with the liquid at higher temperatures will contain an excess of aluminum oxide, which will tend to precipitate a second phase when the mullite is cooled or used in an application at lower temperatures. In contrast, the composition of the glass fibers formed in accordance with the principles of the present invention can be independently chosen to be within the mullite phase field at the intended application temperature. The glass fibers can be heated to convert them to pure crystalline mullite fibers which are stable with respect to precipitation of a second phase at the application temperature.

It is also possible to draw glass fibers in many cases where recalescence (heat released by the cystallization resulting in a temperature increase to the melting temperature) is observed. For example, glass fibers of the mullite composition may be obtained as described in this Example even where recalescence is observed.

EXAMPLE 4

Fibers Drawn From Undercooled Melts using Contained Systems

Figure 6:
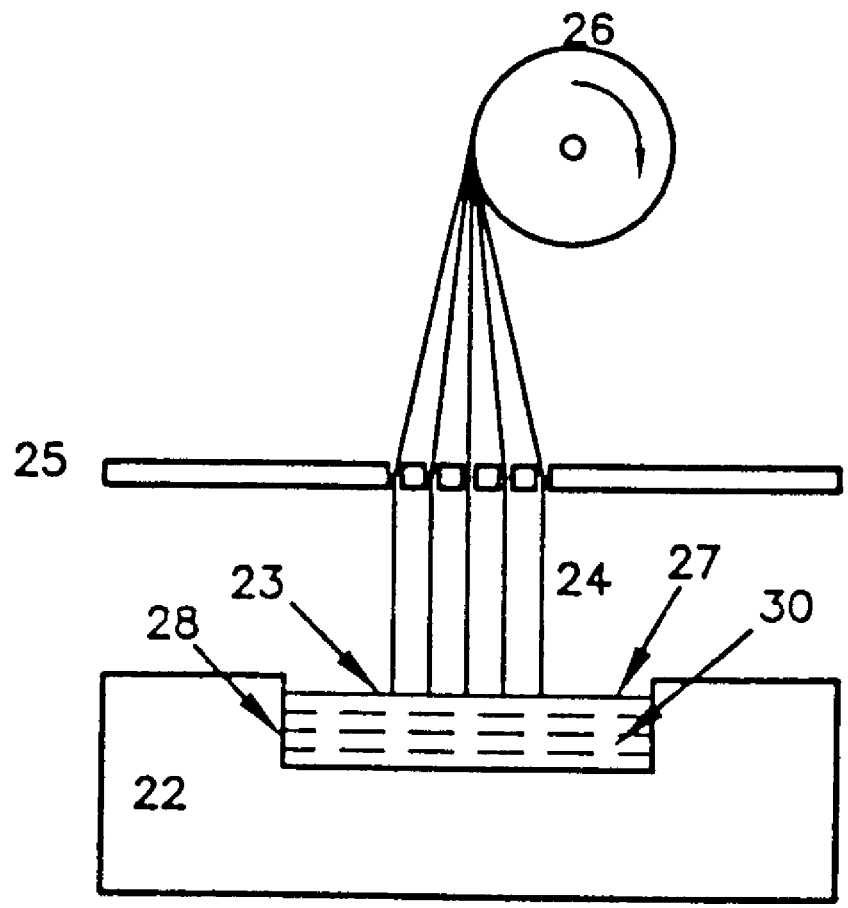
FIG. 6 depicts an embodiment of a method in accordance with the principles of the present invention for drawing fibers from an undercooled melt maintained in a non-isothermal container.
Figure 6:
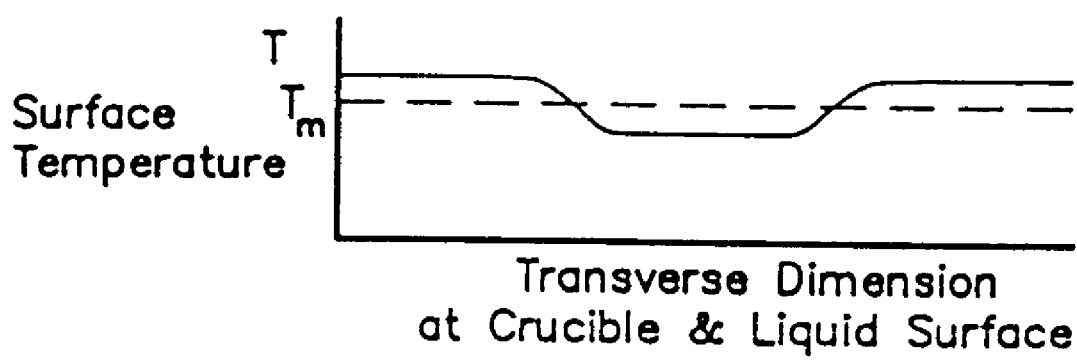

The invention also contemplates fibers drawn in contained systems. FIG. 6 illustrates a preferred embodiment of a method of supporting a liquid using a container which facilitates fiber drawing from undercooled melts without recrystallization. An important feature of the method includes establishing and maintaining a temperature gradient within the container, such that part of the molten mass is undercooled. In this method, the material of interest 30 is placed within an open container 22 such as a crucible, which container is maintained at a temperature above the melting temperature. A cover 25, also maintained at a temperature above the melting temperature, may be initially placed on the container to achieve thermal equilibrium inside the container and complete melting of the material. The cover may then be raised or removed, permitting heat loss and cooling of the melt surface. The heat transfer conditions at the melt surface 23 can be controlled so that the central region of the exposed melt surface is undercooled permitting the drawing of fibers from the undercooled liquid. The inner walls of the container 28 and a small part of the liquid 27 in close proximity to the walls of the container can be maintained above the melting temperature so that heterogeneous nucleation of crystals cannot occur at the walls.

FIG. 6 shows the heating crucible 22 and the molten material 30 from which several fibers 24 may be drawn through openings in the raised cover 25 that are larger than the fibers or through openings in a separate guide, by the action of, for example, a motor and wheel 26 or other drawing means. The fiber material removed from the melt can be replenished by adding and melting solid material in the region where the melt temperature exceeds the melting temperature. Drawing is initiated by the use of one or more stingers (not shown) as described in Example 1 above, or by action of the motor and wheel assembly or other drawing means.

The temperature at the top surface of the liquid and of the crucible is schematically illustrated in the bottom part of FIG. 6 as a function of the transverse position at the top surface of the crucible and contained liquid. The equilibrium melting temperature is designated by $T_m$ on the ordinate of this part of FIG. 6. The temperature of the crucible and of that part of the liquid near the crucible walls is above $T_m$, while the temperature of the liquid surface further from the container walls decreases to a value less than $T_m$. The temperature at the center of the exposed liquid surface can be estimated as follows, assuming the diameter of the container is much larger than the depth of liquid, so that heat is conducted to the surface from the bottom. For purposes of estimating the magnitude of the temperature gradient it is also assumed that convective heat loss is negligible, that heat is lost form the liquid surface only by radiation, and that radiant heat is not reflected back onto the liquid surface. The temperature decrease in the liquid is then approximated by the equation below, where the right side gives the heat flux from the bottom surface, which is maintained at the crucible temperature, to the top surface of the liquid and the left side gives the radiant heat loss from the liquid surface:

$$\sigma \varepsilon T_s^4 = k \frac{Tc - Ts}{h}$$

where sigma=$5.67 \times 10^{-12}$ watt/(cm$^2$ degrees K$^4$), the Stefan-Boltzmann constant, epsilon is approximately 0.8 for liquid oxides, the emissivity of the liquid surface, $T_s$, is the temperature of the liquid surface, $T_c$, is the temperature of the crucible, and h is the depth of the liquid layer.

Typical values for the thermal conductivity, k, of oxides at high temperatures are in the range 0.02 to 0.2 watt/(cm degree C.).

Using mullite as an example, with $T_c$=1900 degrees C. (slightly above the melting temperature) and $T_s$=1670 degrees C. (approximately 200 degrees C. of undercooling) we obtain h=0.045 to 0.45 cm, depending on the actual value of k.

The above calculation shows that an estimated liquid depth less of than 0.5 cm is sufficient to obtain deep undercooling at the surface of liquid in a container maintained above the melting temperature. This depth is small enough that the assumption of a liquid depth much less than the diameter of the container can be readily satisfied.

EXAMPLE 5

Effect of Gaseous Environment and Recalescence

The degree of undercooling, the formation of bulk glass, and the conditions for fiber drawing were found to depend on the gaseous environment. In this Example, fiber drawing under three different gaseous environments are reported: air, pure oxygen, and pure argon gas. It is contemplated, however, that other gases may be utilized in the present invention, however, such as, for example, other inert gases such as nitrogen, or helium, carbon monoxide, carbon dioxide, hydrogen and water vapor, among others.

For example, bulk glass of the $Y_3Al_5O_{12}$ composition may be formed in argon, without crystallization. In air or oxygen, the liquid $Y_3Al_5O_{12}$ composition crystallizes spontaneously when it is undercooled. A second example is provided by pure aluminum oxide, for which the liquid could be cooled to 450 degrees C. below the melting temperature in argon and only 360 degrees C. below the melting temperature in air or oxygen, before spontaneous crystallization occurred. The heat released by the crystallization results in recalescence. It is possible to draw glass fibers in all cases where bulk glass samples are formed and crystallization does not occur when the melt is cooled. It is often possible to draw glass fibers in many cases even where recalescense is observed. For example, in an oxygen environment, glass fibers of the mullite composition may be obtained where recalescense was also observed. These fibers were drawn from the undercooled melt at temperatures above the temperature at which crystals nucleated from the melt and spontaneous crystallization of the melt occurred.

Typical bulk liquid cooling rates were 100–500 degrees C./second under conditions that resulted in spontaneous crystallization of the undercooled melt with recalescence. It is known that glass formation from a melt will occur if the cooling rate exceeds the critical cooling rate for glass formation; thus the observation of recalescence indicates that the critical cooling rate was not achieved in the bulk liquid. However, glass fibers may still be obtained by drawing the fibers when the liquid temperature is greater than the temperature at which spontaneous crystallization occurred. These results demonstrate that the process of drawing a fiber results in a cooling rate in the fibers that exceeds the free cooling rate of the liquid drop.

EXAMPLE 6

Novel Fiber Compositions

A Table 1 lists the compositions of some of the novel fibers which may be obtained using the methods of the invention. The fibers listed in Table 1 may be drawn using a variety of methods, including the stinger and drawing device described in Example 1 and the stinger and motor wheel assembly shown in FIG. 3 and described in Example 2. Melts may be suspended using any levitation means, including both the AAL and the CNL devices described above, or melts may be contained as described, for example, in Example 4 above. The solid samples are formed from the pure elemental oxides by laser-hearth melting, a process which is well-known in the art. Additives of neodymium or erbium are used, for example, with a composition including 50:50 $Al_2O_3$:$SiO_2$, a composition including 63:37 $Al_2O_3$:$Y_2O_3$ as shown in Table 1), although it is contemplated that other compositions and other ratios of these compositions will also produce drawn fibers with additives according to the invention.

TABLE I

Chemical composition of glass fibers pulled from undercooled melts.

| Chemical composition, mol fractions | Additives |
|---|---|
| Alumina-silica materials: | |
| 0.50 $Al_2O_3$ + 0.50 $SiO_2$ | |
| 0.50 $Al_2O_3$ + 0.50 $SiO_2$ | $Nd_2O_3$, 1% to 20% of the total content by weight |
| 0.50 $Al_2O_3$ + 0.50 $SiO_2$ | $Er_2O_3$, 1% to 20% by weight |
| 0.60 $Al_2O_3$ + 0.40 $SiO_2$ | |
| 0.67 $Al_2O_3$ + 0.33 $SiO_2$ | |
| 0.69 $Al_2O_3$ + 0.31 $SiO_2$ | |
| 0.70 $Al_2O_3$ + 0.30 $SiO_2$ | |

TABLE I-continued

Chemical composition of glass fibers pulled from undercooled melts.

| Chemical composition, mol fractions | Additives |
|---|---|
| 0.71 $Al_2O_3$ + 0.29 $SiO_2$ | |
| Alumina-yttria materials: | |
| | |
| 0.63 $Al_2O_3$ + 0.37 $Y_2O_3$ | |
| 0.63 $Al_2O_3$ + 0.37 $Y_2O_3$ | $Nd_2O_3$, up to 5 mol % substituted for $Y_2O_3$ |
| 62.5% $Al_2O_3$ + 36.5% Y2O3 | 1 mol % Nd2O3 or 1 mol % of Er2O3 |
| 63.5 $Al_2O_3$ + 35.5% Y2O3 | 1 mol % Er2O3 |
| Other materials: | |
| | |
| 0.50 $Al_2O_3$ + 0.50 CaO | |
| 0.30 $Al_2O_3$ + 0.70 CaO | |
| 0.67 MgO + 0.33 $SiO_2$ (Forsterite) | |
| 0.50 $Al_2O_3$ + 0.50 $La_2O_3$ | |
| 0.35 $Al_2O_3$ + 0.35 LiO + 0.30 $SiO_2$ | |

For temperatures at or above the melting temperatures, oscillations and fluid flow observed in the levitated melts indicate that the melts are of a low viscosity, comparable to the viscosity of liquid aluminum oxide and much less than the viscosity of typical glass-forming materials such as pure silicon dioxide or silica-rich melts. The low viscosity of these melts is also shown by the fact that fibers could not be drawn from the melts at temperatures above the melting temperature. However, in all cases described herein, drawing of glass fibers may be achieved from undercooled melts using the methods of the invention. The glass fibers drawn from the melts in all cases are uniform in appearance. Visual examination under a microscope reveals no evidence of precipitation of secondary phases in the fibers.

The synthesis of glass fibers with large concentrations of optically-active dopants may be obtained by adding $Nd_2O_3$ and $Er_2O_3$ to the 50:50 $Al_2O_3$:$SiO_2$ and the 63:37 $Al_2O_3$:$Y_2O_3$ materials. The additive concentrations used are much larger than the typical molar concentrations of 1% or less in prior art fibers. The present method achieves these fibers with large additive concentrations by first heating the material to a temperature above the equilibrium melting temperature of the material, where all components form a completely melted liquid. It should be noted that the amount of additive which will dissolve in a melt increases with increasing melting temperature. Surprisingly, by dissolving the additives at a melt temperature higher than the equilibrium melting temperature of the materials, we have invented a method where the amount of additive which remains dissolved in the undercooled melt is greater than what would be expected at the undercooled temperature. Using conventional methods, the lower the temperature of the melt, the less the amount of additive that may be dissolved. Upon undercooling of the melt, the viscosity increases sufficiently so that glass fibers may be drawn from the melt without precipitation of the additives. The undercooled melt does not crystallize and it remains homogeneous, allowing the glass fibers with higher than expected concentrations of additives to be formed. It should be understood that the additive concentrations achieved by the present invention exceed those additive concentrations found in prior art fibers where the additives are added to previously drawn fibers as described above. In contrast to these prior art methods, an important feature of the method of the present invention is that the concentration of the additives in the fibers of the invention is not limited by additive solubility at the drawing temperature.

In addition, the synthesis of very high purity fibers and fibers with extremely small concentrations of additives is also possible. The use of containerless conditions to maintain the melt allows the melt to be purified by (i) evaporation of the impurities and (ii) reactive gasification of the impurities. For example, aluminum oxide which initially contains about 0.0005 molar percent of chromium (5 parts per million chromium) may be purified by containerless melting and heating of the liquid to temperatures up to 2400 degrees C. The analyzed chromium concentration is reduced by factors up to 1 million times in a few minutes of processing. Similarly, purification of many oxides by evaporation is possible by means known in the prior art. When materials are processed at very high temperatures in a container, the dissolution of container material in the melt will prevent purification of the liquid. Therefore, by purifying the liquid under containerless conditions, fibers containing less than 0.0001 molar percent (1 part per million) of impurities can be formed. Similarly, by first purifying the liquid, additives may be used to achieve controlled additive concentrations in the range from less than 0.0001 molar percent up to 50 molar percent in fibers pulled from the liquid.

Glass fibers with the chemical composition $CaAl_2O_4$ are synthesized under containerless conditions according to the methods of the invention, undercooling the melt sufficiently so that fibers could be drawn. The method of fiber pulling is that depicted in FIG. 3, and levitation is in oxygen gas. The fibers are pulled from a melt that is undercooled to a temperature approximately 200 degrees C. below the melting temperature of the material. Upon further undercooling, crystallization does not occur and bulk glass samples of $CaAl_2O_4$ were obtained. It is anticipated that other methods of fiber pulling may be used, for example, the stinger drawing device shown in FIG. 1, and any method which results in pulled fibers is contemplated to be within the scope of the invention.

Using the methods of the invention, glass fibers may be synthesized from CaO—$A_2O_3$ melts, which fibers may be used as bio-compatible structural materials which will not cause silicosis if inhaled, as disclosed in U.S. Pat. No. 5,552,213, the disclosure of which is incorporated herein.

Using the methods of the invention, glass fibers may also be formed with the chemical composition of the mineral forsterite, $Mg_2SiO_4$. This mineral is thermodynamically compatible with the mineral enstatite, $Mg_2Si_2O_6$, which is known in the prior art to be an interphase weakening coating for use in toughening composite materials. The forsterite fibers are formed using the fiber-stinger device illustrated in FIG. 1 and from melts levitated and undercooled in the conical nozzle levitation device.

Figure 5:
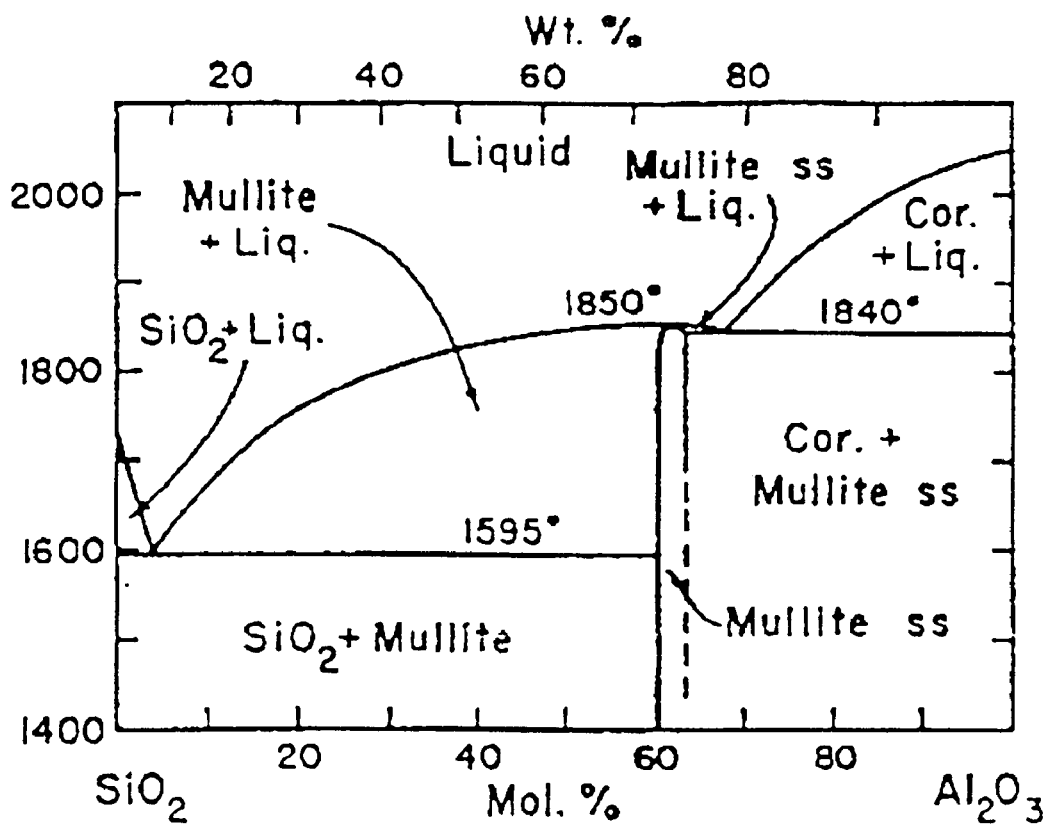
FIG. 5 is a typical alumina-silica phase diagram.

FIG. 5 shows the equilibrium phase diagram of the alumina-silica system, illustrating the full range of compositions between pure silicon oxide and aluminum oxide. It can be seen in Table I that the present work achieved glass fiber formation over a wide range of compositions that includes compositions for which pure mullite is stable at lower temperatures.

EXAMPLE 7

Crystallization of Drawn Fibers

Glass fibers made according to the invention may also be crystallized. Table II reports the crystallization of mullite composition glass fibers, e.g., 60:40 $Al_2O_3$:$SiO_2$ at temperatures of 1100° C. and 1200° C. Table II presents tensile test data for glass fibers drawn from undercooled melts and for crystalline fibers formed by heating the drawn fibers in air, although it is contemplated that all fibers drawn in accordance with the methods of the invention will have superior tensile strengths over conventionally drawn fibers of similar compositions. It is of interest to note that the fibers as-pulled have very high tensile strengths as compared to prior art drawn fibers of the same compositions, in some cases as much as 10% to 250% greater. The tensile strengths of commercially available prior art fibers with compositions similar to mullite is generally less than 3 GPa, compared with the tensile strength values of up to 6.4 GPa in fibers of the mullite composition obtained in accord with the principles of the present invention.

The YAG-composition fibers reported in Table II contained 1% of Nd2O3 substituted for Y2O3. The results labeled "preliminary experiments" were measured on fibers of non-uniform diameter that were obtained in the first experiments performed to make fibers with this composition and are based on the minimum diameter of the fibers. The results in Table II labeled "selected fibers" were measured on fibers obtained in later experiments and which were inspected to show that the diameters were uniform. All of the glass fibers produced in accordance with the invention, independent of the dopant concentrations, were flexible and could be bent to small radii, showing that the tensile strengths of the fibers were of comparable values to the measured results given in Table II.

TABLE II

Properties of Mullite-Composition and YAG-Composition Fibers

| Fiber Condition | Fiber Diameter, μm | Tensile Fracture Strength, GPa |
|---|---|---|
| Mullite-Composition Fibers | | |
| As-Pulled | 32.0 | 6.45 |
| As-Pulled | 20.5 | 4.68 |
| As-Pulled | 32.7 | 5.21 |
| As-Pulled | 30.5 | 6.14 |
| As-Pulled | 33.0 | 5.55 |
| Crystallized at 1100 C° | 19.0 | 0.78 |
| Crystallized at 1200 C° | 8.0 | 1.00 |
| Crystallized at 1200 C° | 28.0 | 0.66 |
| YAG-Composition Fibers | | |
| As pulled | | 2.47 |
| As pulled | | 2.34 |
| Selected fiber | | 5.43 |
| Selected Fiber | | 4.67 |
| Selected Fiber | | 4.99 |

Separate experiments using differential thermal analyses have demonstrated that glass with the mullite composition will crystallize when heated to a temperature above 970° C. and that glass with the YAG composition will crystallize when heated to a temperature above 920° C. These results demonstrate that the process of drawing glass fibers from an undercooled melt, followed by heating to a crystallizing temperature of the invention, yields crystalline fibers with controlled chemical compositions that are stable at the crystallization temperatures.

The fiber drawing rate is controlled to typically exceed the crystallization velocity of the undercooled melt and the cooling rate achieved in the fibers is typically greater than the critical cooling rate for glass formation in the materials that were drawn into fibers. The crystallization velocities or the critical cooling rates for glass formation are not precisely known as a function of temperature. For mullite fibers, a fiber drawing rate of 30 cm/s is sufficient to avoid melt crystallization. The crystallization velocity of mullite is approximately 3 cm/s at 200 K below the melting temperature.

The crystallization velocity is greater for liquid yttria-alumina than for liquid mullite compositions. Yttria-alumina glass fibers of a few mm in length were drawn at 30 cm/s and fibers up to 60 cm long were drawn at 100 cm/s, using the motor and wheel assembly depicted in FIG. 3, in a flow of pure argon gas. The liquid was cooled to approximately 650 degrees C. below the melting temperature.

As shown in Example 2, the cooling rate achieved in the fibers will decrease as the fiber diameter increases. The drawing rate required to obtain fibers with a given diameter will also decrease as the fiber diameter increases. Thus, in the drawing of large diameter fibers, conditions may occur in which the cooling rate achieved in the fibers is less than the critical cooling rate for glass formation. The fibers obtained under this condition will then contain at least some crystalline material. Further, if the crystallization velocity under the fiber drawing conditions exceeds the fiber drawing rate, the crystals formed in the fiber will propagate in the fiber to cause crystallization of the undercooled liquid from which the fibers are formed, thus terminating the fiber drawing process.

It should be understood that various changes and modifications to the preferred embodiments described herein will be apparent to those skilled in the art. Such changes and modifications can be made without.departing from the spirit and scope of the present invention and without diminishing its attendant advantages. It is therefore intended that such changes and modifications be within the scope of the claims.

What is claimed is:

1. A drawn glass fiber comprising alumina-lanthana compositions and produced by a process comprising:

forming a melt having an equilibrium melting temperature by completely melting precursor components;

at least partially undercooling the melt; and drawing a glass fiber from an undercooled portion of the melt;

wherein the step of drawing a glass fiber further comprises the step of using a stinger to initiate fiber drawing and further wherein the melt has a viscosity at the equilibrium melting temperature of less than 101 poise.

2. The drawn glass fiber of claim 1 further comprising oxides.

* * * * *